United States Patent [19]

Birnbaum et al.

[11] Patent Number: 5,240,214
[45] Date of Patent: Aug. 31, 1993

[54] DECK RAIL MOUNTING DEVICE

[76] Inventors: Martha R. Birnbaum, 37 Candlewood Dr., Pittsford, N.Y. 14534; Lars Rosenquist, Rochester, N.Y. 14618

[21] Appl. No.: 909,576

[22] Filed: Jul. 6, 1992

[51] Int. Cl.⁵ .............................................. A47B 96/06
[52] U.S. Cl. .................................... 248/231.4; 248/214
[58] Field of Search .................... 248/558, 148, 231.4, 248/214, 210, 238, 311.2; 182/129

[56] References Cited

U.S. PATENT DOCUMENTS

| | | | |
|---|---|---|---|
| 722,828 | 3/1903 | Fergusson | 248/231.4 |
| 2,473,951 | 6/1949 | Hickey | 248/210 X |
| 2,584,050 | 1/1952 | Robins | 248/214 X |
| 4,059,248 | 11/1977 | Kuntz | 248/214 |
| 4,141,524 | 2/1979 | Corvese | 248/231.4 X |
| 4,432,525 | 2/1984 | Duvall | 248/231.4 X |
| 4,653,713 | 3/1987 | Hamilton | 182/129 X |
| 4,805,859 | 2/1989 | Hudson | 248/148 |
| 4,819,922 | 4/1989 | Boike | 269/45 |
| 4,874,147 | 10/1989 | Ory | 248/210 |
| 4,967,929 | 11/1990 | Turner | 248/214 X |
| 4,986,505 | 1/1991 | Zabawski | 248/214 |
| 5,007,612 | 4/1991 | Manfre | 248/558 |
| 5,009,380 | 4/1991 | Fee | 248/214 |

Primary Examiner—J. Franklin Foss
Attorney, Agent, or Firm—Howard J. Greenwald

[57] ABSTRACT

An apparatus for slidably attaching an object to a surface is disclosed. The apparatus contains a mounting board with a device for slidably attaching an object to it and a clamp attached to the mounting board. The clamp contains a first clamping member, a second clamping member, and means for adjusting the distance between such clamping members.

9 Claims, 3 Drawing Sheets

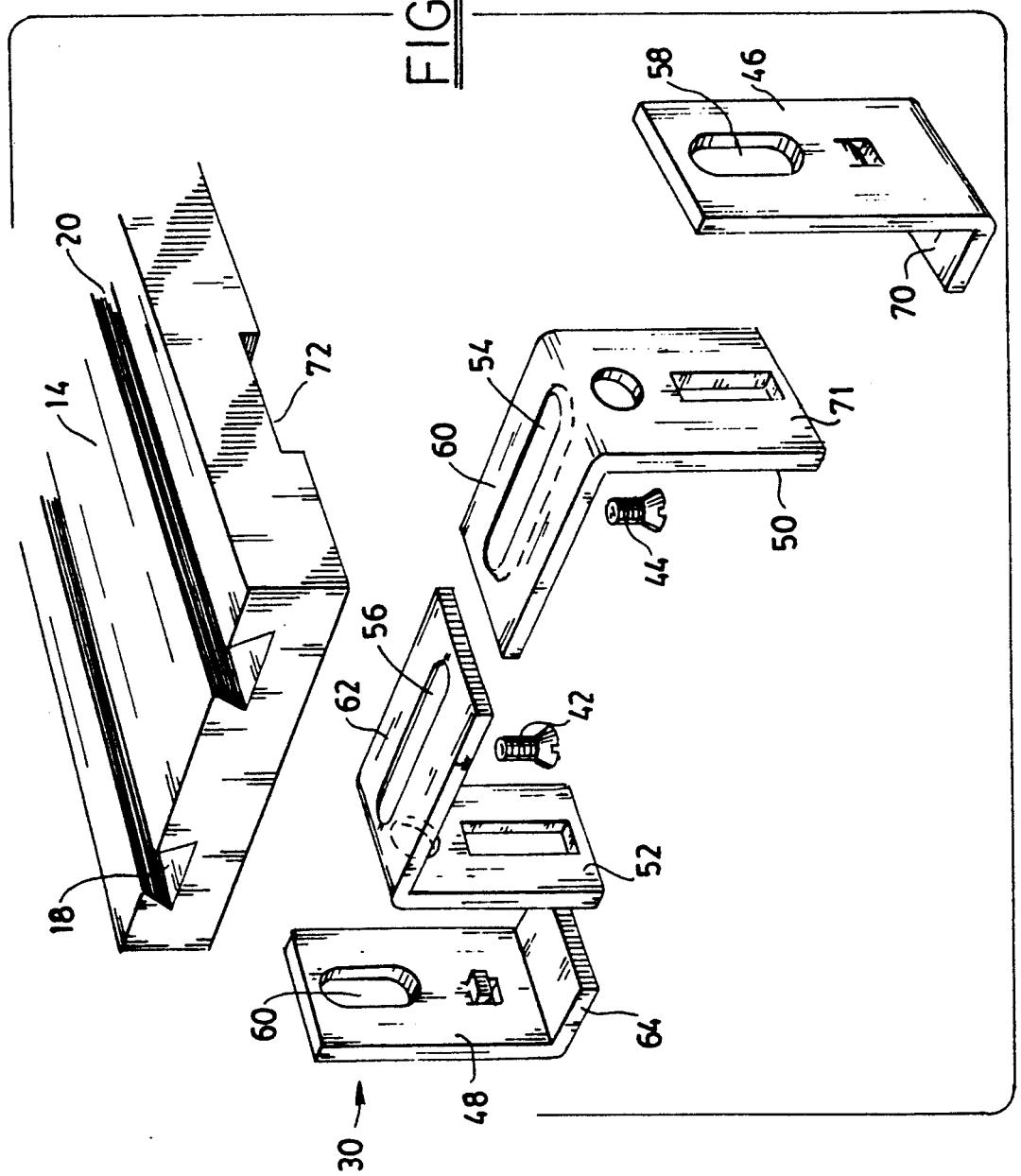

DECK RAIL MOUNTING DEVICE

FIELD OF THE INVENTION

A device adapted to clamp onto a railing, such as a deck railing, to provide an auxiliary support surface.

BACKGROUND OF THE INVENTION

U.S. Pat. No. 5,007,612 of Manfre describes a "rail mate" which is designed to clamp onto a boat handrail and to hold food and drink while a fisherman concentrates upon fishing or other pursuits. However, the device of Manfre has limited utility. In the first place, it is only adapted to be mounted upon a rail of limited thickness. It the second place, it is only secured to the rail on which it is mounted in one direction, thus providing a relatively insecure attachment. In the third place, it only provides a limited number of surfaces onto which various materials may be placed and provides no means of mounting additional surfaces to the clamp.

It is an object of this invention to provide a clamp assembly for mounting upon a rail which can provide a multiplicity of different surfaces for supporting various objects.

It is another object of this invention to provide a clamp assembly for mounting upon many different sized rails.

It is yet another object of this invention to provide a clamp assembly for mounting upon a rail which provides a substantially more secure attachment to said rail than do the prior art clamp assemblies.

SUMMARY OF THE INVENTION

In accordance with this invention, there is provided a clamp for mounting upon a rail. The clamp is comprised of adjustable means for attaching the clamp to a surface parallel to the X axis of the clamp, and adjustable means for attaching the clamp to a surface parallel to the Y axis of the clamp, and a means for slidably and removably connecting a surface extending device to said clamp.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 5 is a partial view of the clamp of FIG. 1, illustrating how a portion of its clamping means is preferably constructed.

DESCRIPTION OF THE PREFERRED EMBODIMENTS

Figure 1:
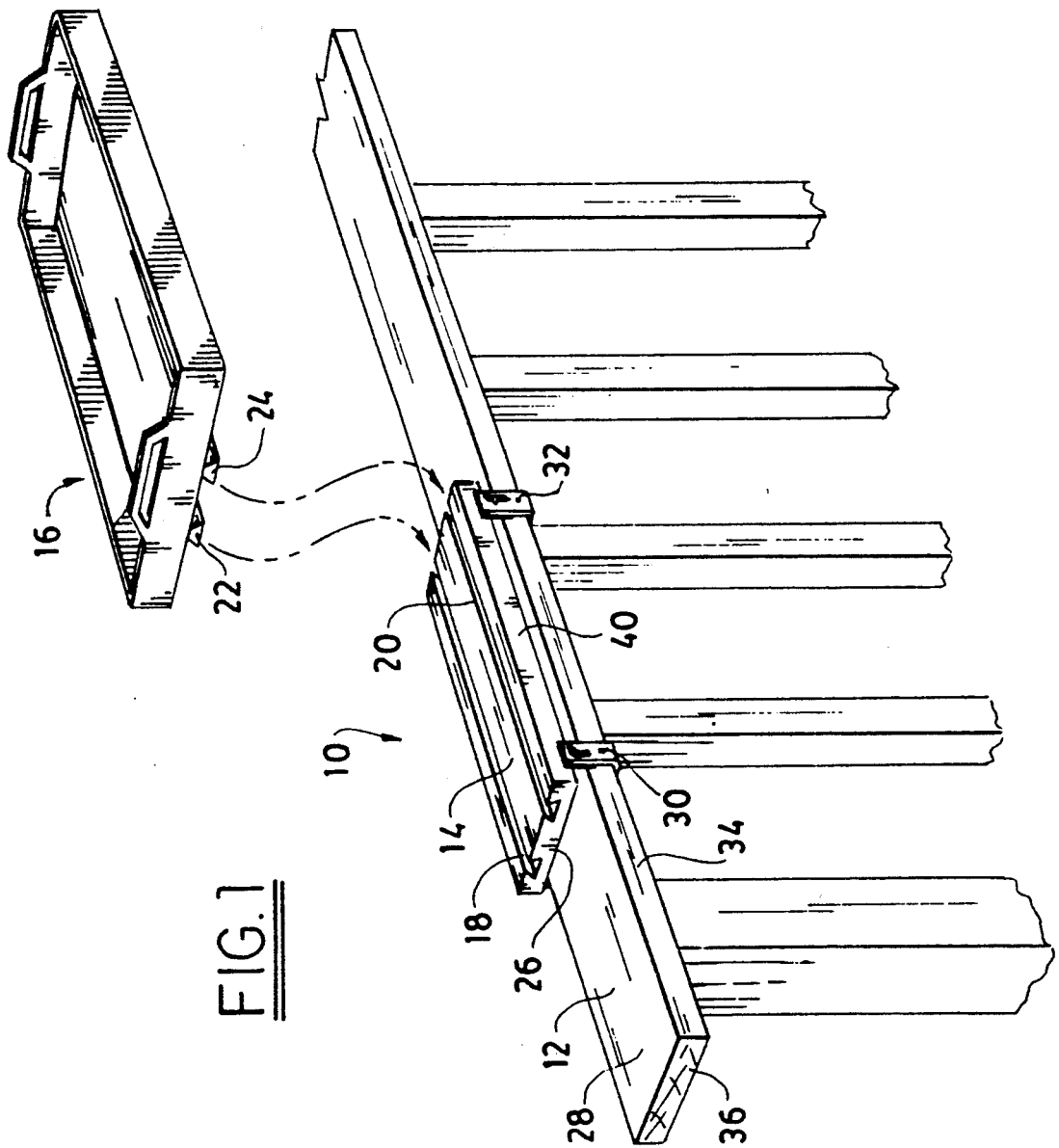
FIG. 1 is a perspective view of one preferred embodiment of the clamp device of this invention, illustrating it mounted upon a deck railing.

FIG. 1 illustrates how one preferred embodiment of applicants' apparatus 10 is mounted upon a rail 12. In the embodiment illustrated in FIG. 1, the rail 12 is a deck rail. However, as will be readily apparent to those skilled in the art, applicants' apparatus 10 may be mounted on many other types of rail.

Thus, by way of illustration, one may utilize apparatus 10 to attach it to a boat handrail, as is described in U.S. Pat. No. 5,007,612 of Manfre, the disclosure of which is hereby incorporated by reference into this specification. Thus, for example, one may use apparatus 10 to secure it to the arm of a chair (such as an Adirondack chair arm), a hutch, a room divider, the side of a truck, and the like. This list is merely illustrative, it being apparent that the number of uses for such apparatus is limited primarily by the imagination of the user.

Referring again to FIG. 1, it will be seen that apparatus 10 is comprised of an upper surface 14 which, in the preferred embodiment illustrated, contains means for slidably and removably attaching a surface extending means 16.

In this preferred embodiment, the slidable attachment means comprises channels 18 and 20 which are adapted to receive runners 22 and 24, respectively, which may be moved within said channels to provide slidable movement to surface extending means 16. As will be apparent to those skilled in the art, many other means may be used to slidably attach surface extending means 16 onto apparatus 10. Thus, for example, one could use fewer or more of such channels and runners, and/or differently shaped channels and runners, one could have the runners attached to said clamp and the channels disposed within said surface extending means, and the like, one may utilize a pair of sliders slidable on slide guide rods, one may use spring-loaded means, and the like.

Referring again to FIG. 1, one surface extending means 16—a tray—is illustrated. However, as will be apparent to those skilled in the art, other such surface extending means adapted to be slidably mounted onto apparatus 10 also may be used. Thus, for example, one may use apparatus 12 with a buffet server, a grill caddy, a planter, a bar, a television table, a bookcase, and the like.

Referring again to FIG. 1, it will be seen that, in the embodiment depicted, lower surfaces 26 of apparatus 10 is substantially parallel to upper surface 28 of rail 12. At least two clamps, clamps 30 and 32, are provided for disposing surface 26 so that it is substantially parallel to surface 28, for securing apparatus 10 to the side 34 (and to the opposing side, not shown) of rail 12, and for securing apparatus 10 to the bottom surface 36 of rail 12.

Figure 2:
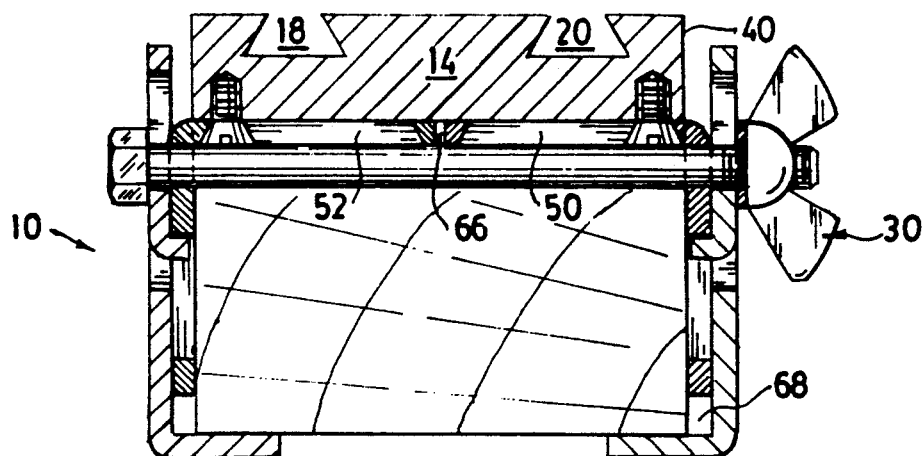
FIG. 2 is one end view of the clamp device of FIG. 1, showing it in its contracted position.
Figure 3:
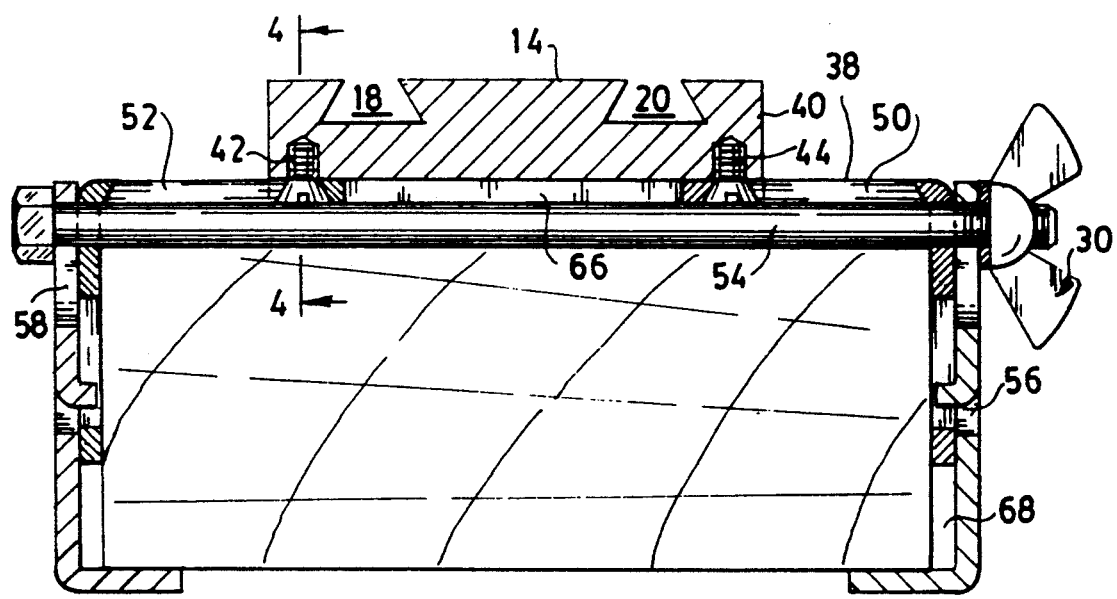
FIG. 3 is another end view of the clamp device of FIG. 1, showing it in its extended position.

FIGS. 2 and 3 illustrate one preferred clamping means for use in the instant invention. However, as will be readily apparent to those skilled in the art, other such means may be used. Thus, by way of illustration and not limitation, one may use any of the clamping means disclosed on pages 124 and 136 of Volume IV of "Ingenious Mechanisms for Designers and Inventors" (Industrial Press, Inc., New York, N.Y., 1977). Thus, e.g., one may using the clamping device disclosed in U.S. Pat. No. 4,819,922, the disclosure of which is hereby incorporated by reference into this specification.

FIG. 2 is a sectional view of apparatus 10, illustrating clamp 30 in more detail.

Referring to FIG. 2, and in the preferred embodiment illustrated therein, it will be seen that clamp 30 (and clamp 32) is comprised of a top surface 38 onto which mounting board 40 may be attached. Although the preferred embodiment illustrated in the Figures utilizes two clamps (clamps 30 and 32), one may use only one such clamp, or three or more of such clamps. Alternatively, or additionally, one may use different clamps than those specifically illustrated in the Figures.

Mounting board 40 may consist essentially of wood, a plastic such as nylon, acetal resin, and other structural materials with good mechanical properties.

The mounting board 40, in the preferred embodiment illustrated, contains channels 18 and 20 which, preferably, have the dovetail configuration illustrated in the Figures. It is preferably secured to the upper surface 38 of clamp 30 by means of fasteners 42 and 44 which, in the embodiment illustrated in the Figures, fasteners 42 and 44 are threaded fasteners.

Referring to FIG. 5, it will be seen that, in one preferred embodiment, claim 30 is comprised of first end member 46, second end member 48, first intermediate member 50, and second intermediate member 52. Each of intermediate members 50 and 52 comprise a vertically-extending slot, such as slots 54 and 56, respectively, through which fasteners 44 and 42 may be inserted and thereafter fastened to the underside 26 of the mounting board 40. As will be apparent to those skilled in the art, the width of clamp 30 may be controlled, to some extent, by where one chooses to inset the fasteners through the slots.

Referring again to FIGS. 2 and 3, it will also be fasteners through seen that clamp 30 also comprises a bolt 54 extending from one end 56 of clamp 30 to another end 58 of clamp 30. The bolt 54 extends through the end members 46 and 48 as well as the intermediate members 50 and 52.

Referring again to FIG. 5, it will be seen that each of end members 46 and 48 is comprised of a slot 58 and a slot 60, respectively. As will be apparent to those skilled in the art, the relative positions of end member 46 and intermediate member 50 (and, separately, of end member 48 and intermediate member 52) may be varied over a wide range while still allowing bolt 54 to extend therethrough. The height of clamp 30, after it has been assembled, may be measured from the top surface 60 of intermediate member 50 to the bottom surface 70 of end member 46 (and alternatively, or additionally, from the top surface 62 of intermediate member 52 to the bottom surface 64 of end member 48. Thus, depending upon which portion of slots 58 and 60 one chooses to insert the bolt through prior to tightening it, one may independently vary the height of each side of clamp 30. By the same token, the same adjustment may be made with clamp 32.

FIG. 2 illustrates one embodiment wherein the space 66 between intermediate members 50 and 52 is minimized. FIG. 3 illustrates another embodiment wherein the space 66 between such members is maximized.

FIG. 2 also illustrates an embodiment in which the space 68 between the top 70 of end bracket 46 and the bottom 71 of intermediate bracket 50 is minimized (see FIG. 5). FIG. 3 illustrates an embodiment in which such space 68 is maximized.

Thus, it will be apparent to those skilled in the art that applicant apparatus provides many different types of flexibility. With regard to each of the clamps 30 and 32, one may independently adjust its width, the height of its right end, and the height of its left end.

Figure 4:
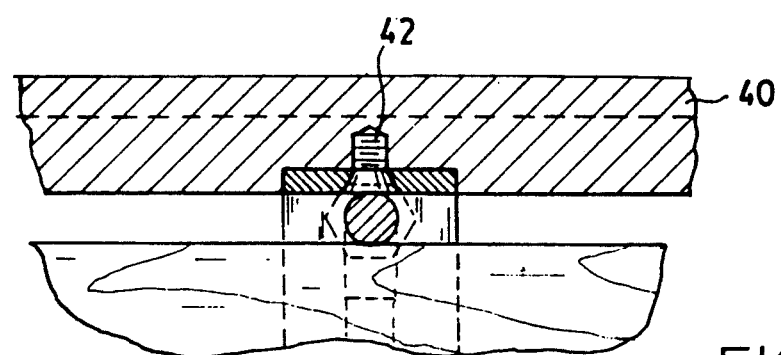
FIG. 4 is a sectional view taken along lines 4—4 of FIG. 3, illustrating the mounting of the bracket of the device of FIG. 1.

FIGS. 4 and 5 illustrate one preferred means for mounting clamps 30 and 32 within a slot, such as slot 72, cut into the bottom surface of the mounting board. As will be apparent to those skilled in the art, clamps 30 and 32 may be mounted within slot 72, and/or within other slots, and/or attached to other surfaces (such as, e.g., a flush surface), etc.

Thus, in one embodiment (not shown), slot 72 (and/or other comparable slots) have a different shape.

Thus, in another embodiment (not shown), at least three clamps are used to support a surface. In this embodiment, one of such clamps is located at about the middle of the surface to be supported, and each of the other two of such clamps are located near the respective proximal and distal ends. Many other comparable arrangements, some of them utilizing more than three clamps, will be apparent to those skilled in the art.

Referring again to FIG. 1, it will be seen that surface extending means 16 may be slidably attached to mounting board 40 by disposing runners 22 and 24 within channels 20 and 18 and, thereafter, may be moved within said channels. In one embodiment, means for limiting the extent of slidable motion within said channels are provided. Such conventional stop means are well known to those in the art.

In one embodiment, not shown, the apparatus of this invention is used to connect one or more screens to a rail in order to construct a privacy screen.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. An apparatus for slidably attaching an object to a surface, wherein said apparatus is comprised of (a) an integral, substantially solid mounting board comprised of means integrally formed with said mounting board for slidably attaching an object to said mounting board (b) a first clamp attached to said mounting board, wherein said first clamp is comprised of a first clamping member, a second clamping member, and means for adjusting the distance between said first clamping member and said second clamping member, (c) an integral object slidably mounted to said mounting board; and (d) means for adjusting the distance between the top of said mounting board and the bottom of said integral object.

2. The apparatus as recited in claim 1, wherein said mounting board is comprised of a channel.

3. The apparatus as recited in claim 2, wherein said apparatus is comprised of a second clamp.

4. The apparatus as recited in claim 3, wherein said second clamp is comprised of a third clamping member, a fourth clamping member, and means for varying the distance between said third clamping member and said fourth clamping member.

5. The apparatus as recited in claim 4, wherein said apparatus is comprised of means for adjusting the distance between the top of said mounting board and the bottom of said first clamping member.

6. The apparatus as recited in claim 5, wherein said apparatus is comprised of means for adjusting the distance between the top of said mounting board and the bottom of said second clamping member.

7. The apparatus as recited in claim 6, wherein said apparatus is comprised of means for adjusting the distance between the top of said mounting board and the bottom of said third clamping member.

8. The apparatus as recited in claim 7, wherein said apparatus is comprised of means for adjusting the distance between the top of said mounting board and the bottom of said fourth clamping member.

9. The apparatus as recited in claim 8, wherein said mounting board is comprised of two channels.

* * * * *